United States Patent
Kim (10) Patent No.: US 7,278,520 B2
(45) Date of Patent: Oct. 9, 2007

(54) WHEEL LOCKING DEVICE FOR VEHICLE

(76) Inventor: Young-Hoon Kim, 486-23, Banghwa-dong, Gangseo-gu, Seoul (KR) 157-220

( * ) Notice: Subject to any disclaimer, the term of this patent is extended or adjusted under 35 U.S.C. 154(b) by 178 days.

(21) Appl. No.: 10/535,644

(22) PCT Filed: Jan. 7, 2003

(86) PCT No.: PCT/KR03/00022

§ 371 (c)(1),
(2), (4) Date: May 19, 2005

(87) PCT Pub. No.: WO2004/048168

PCT Pub. Date: Jun. 10, 2004

(65) Prior Publication Data

US 2006/0065494 A1    Mar. 30, 2006

(30) Foreign Application Priority Data

Nov. 27, 2002    (KR) ................. 10-2002-0074211

(51) Int. Cl.
*B60B 39/00* (2006.01)
*B60T 1/14* (2006.01)
*B60T 3/00* (2006.01)

(52) U.S. Cl. .................. 188/4 R; 188/265; 188/32; 70/226

(58) Field of Classification Search .............. 188/265, 188/7, 4 R, 5, 32; 70/226, 228, 237
See application file for complete search history.

(56) References Cited

U.S. PATENT DOCUMENTS

| | | | | |
|---|---|---|---|---|
| 3,695,071 A | * | 10/1972 | West .................... | 70/225 |
| 4,913,265 A | * | 4/1990 | Richards ............... | 188/32 |
| 5,214,944 A | * | 6/1993 | Wolthoff ............... | 70/226 |
| 5,301,527 A | * | 4/1994 | Pollard ................. | 70/226 |
| 5,333,477 A | * | 8/1994 | Davis ................... | 70/226 |
| 5,706,682 A | * | 1/1998 | Barker et al. ........ | 70/226 |

(Continued)

FOREIGN PATENT DOCUMENTS

GB        2106058      *   4/1983

(Continued)

*Primary Examiner*—Devon Kramer
(74) *Attorney, Agent, or Firm*—Jordan and Hamburg LLP (57) ABSTRACT

Disclosed is a wheel locking device for vehicle which prevents an unauthorized movement of the vehicle. The wheel locking device for vehicles comprises a supporting disk attached to an outer side surface a wheel and provided with arms, fixtures inserted into the arms so as to surround a circumferential surface of the wheel, clamping pins for fixing the fixtures, a guard disk for surrounding an outer side surface of the supporting disk so as to cover the clamping pins, a clamping bolt for holding the guard disk and the supporting disk together, a lock for locking the clamping bolt. The wheel locking device is easily assembled and attached to the wheel, and is effectively protected from an unauthorized separation from the wheel. Further, the locations of the fixtures are adjusted according to the size of the wheel of the vehicle or the fixture has a folding-type structure easily fixed to the wheel without interfering with the frame of the vehicle, thereby being firmly secured to the wheel.

3 Claims, 8 Drawing Sheets

U.S. PATENT DOCUMENTS

| | | | |
|---|---|---|---|
| 5,715,711 A * | 2/1998 | Jennison | 70/226 |
| 5,833,034 A | 11/1998 | Banholzer | |
| 6,116,062 A * | 9/2000 | Markegard et al. | 70/19 |
| 6,125,672 A * | 10/2000 | Diez | 70/226 |
| 6,430,978 B1 * | 8/2002 | Chen | 70/209 |
| 6,553,797 B2 * | 4/2003 | Witchey | 70/209 |

FOREIGN PATENT DOCUMENTS

| | | |
|---|---|---|
| JP | 58-76348 | 5/1983 |
| JP | 58-76349 | 5/1983 |
| JP | 58-93656 | 6/1983 |

* cited by examiner

FIG. 8

WHEEL LOCKING DEVICE FOR VEHICLE

TECHNICAL FIELD

The present invention relates to a wheel locking device for vehicles attached to a wheel of a vehicle so as to prevent an unauthorized movement of the vehicle, and more particularly to a wheel locking device for vehicles in which a plurality of fixtures are fixed to a circumferential surface of the wheel at regular intervals so as to prevent the unauthorized movement of the vehicle due to detachment of the fixtures from the wheel and to allow lengths of the fixtures to be controllable according to the size of the wheel.

BACKGROUND ART

Generally, when illegally parked vehicles are found, drivers of the vehicles, i.e., violators receive a notification for parking violation and simultaneously the violator's vehicles are towed away by a tow truck.

Since it takes much time for the tow truck to reach to the site of the violator's vehicles, the violators often escape with their vehicles before the two truck arrives.

Thus, the violator's vehicles must be locked up so as to prevent an unauthorized movement of the vehicles by their own drivers. Therefore, a locking device for vehicles for preventing the unauthorized movement of the vehicles is required.

On the other hand, in order to protect vehicles from theft, wheel locking devices for locking wheels of vehicles are conventionally disclosed so as to prevent the movement of the vehicles even when doors or ignitions are compromised by thieves.

One of the aforementioned wheel locking devices is described by Korean Utility Model Registration No. 10710. Herein, two panels are prepared in parallel and rotatably connected to each other via a frame. One panel has a bent-up free end, and the other panel has an end provided with a shield. A screw hole is formed in one panel, and an insertion groove is formed in the other panel. A clamp is inserted into the screw hole and the insertion groove of the two panels, thereby holding two panels together. The other panel is further provided with a clasp and a hanging loop.

In order to secure the above wheel locking device to a wheel of a vehicle, the locking device is installed so that the panel provided with the bent-up free end is fixed to an inner side surface of the wheel and the shade of the other panel covers an outer side surface of the wheel.

Herein, the two panels are held together by the clamp inserted thereinto. The clasp covers a head of the clamp, and then is secured to the hanging loop. Then, the clasp is locked up with a conventional lock, thereby preventing an unauthorized movement of the vehicle.

However, the above-described conventional locking device has several problems as follows.

First, since the panels of the locking device are fixed to a part of the circumferential surface of the wheel, the locking device is not tightly fixed to the wheel, thereby being easily separated from the wheel.

Particularly, only the bent-up free end of the inner panel is fixed to the wheel, and when the bent-up free end of the inner panel is pulled by force, the bent-up free end is straightened. Therefore, the panels are easily separated from the wheel.

Second, a plurality of locking devices are required so as to fix plural parts on the circumferential surface of the wheel and to more firmly lock the wheel, and a locked state of each locking device and the wheel is maintained by means of a lock. Therefore, in this case, it is inconvenient to fix plural locking devices to a single wheel, and it takes time to separate the plural locking devices from the wheel. However, the plural locking devices cannot prevent an unauthorized movement of the vehicle.

Third, since the clasp for protecting the clamp covers only the head of the clamp, when the clasp is separated from the device by force, the clamp is exposed to the outside and the locking device is easily disassembled.

Fourth, since the locking device does not comprise means for adjusting the length of the panels according to the size of the wheel, various locking devices having different sizes of panels corresponding to the sizes of the wheels must be produced.

DISCLOSURE OF THE INVENTION

Therefore, the present invention has been made in view of the above problems, and it is an object of the present invention to provide a wheel locking device for simply and firmly locking up a wheel of vehicles, thereby protecting the vehicle from theft or unauthorized movement and maximizing the safety and reliability of the device.

It is another object of the present invention to provide a wheel locking device which is secured to a wheel of vehicles regardless of the size of the wheel, thereby maximizing its installation efficiency.

In accordance with the present invention, the above and other objects can be accomplished by the provision of a wheel locking device for vehicles, which is attached to a wheel of a vehicle so as to surround the wheel, and locks the wheel by means of a lock so as to prevent an unauthorized movement of the vehicle, comprising a supporting disk provided with at least one arm being radially formed along its circumference and having a long hole formed through the arm; fixtures, each including an insertion part inserted into the hole of the arm, and a U-shaped clamp part so as to surround an inner side surface of the wheel; clamping pins, each being inserted into a body of the supporting disk and the insertion parts of the fixtures so as to prevent the fixtures from separating from the supporting disk; a guard disk for surrounding an outer side surface of the supporting disk so as to at least cover and protect the clamping pins inserted into the supporting disk; a clamping bolt screwed into the guard disk and the supporting disk so as to hold the guard disk and the supporting disk together; and locking means for preventing the loosening of the clamping bolt from the guard disk and the supporting disk.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, preferred embodiments of the present invention will be described in detail with reference to the annexed drawings.

A wheel locking device for vehicles in accordance with an embodiment of the present invention is shown in FIGS. 1 to 4.

The wheel locking device for vehicles, which is attached to a wheel 3 of a vehicle 2 so as to surround the wheel 3, and locks the wheel 3 by means of a lock so as to prevent an unauthorized movement of the vehicle 2, comprises a supporting disk 10, fixtures 20, clamping pins 30, a guard disk 35, a clamping bolt 40, and locking means 55.

Figure 2:
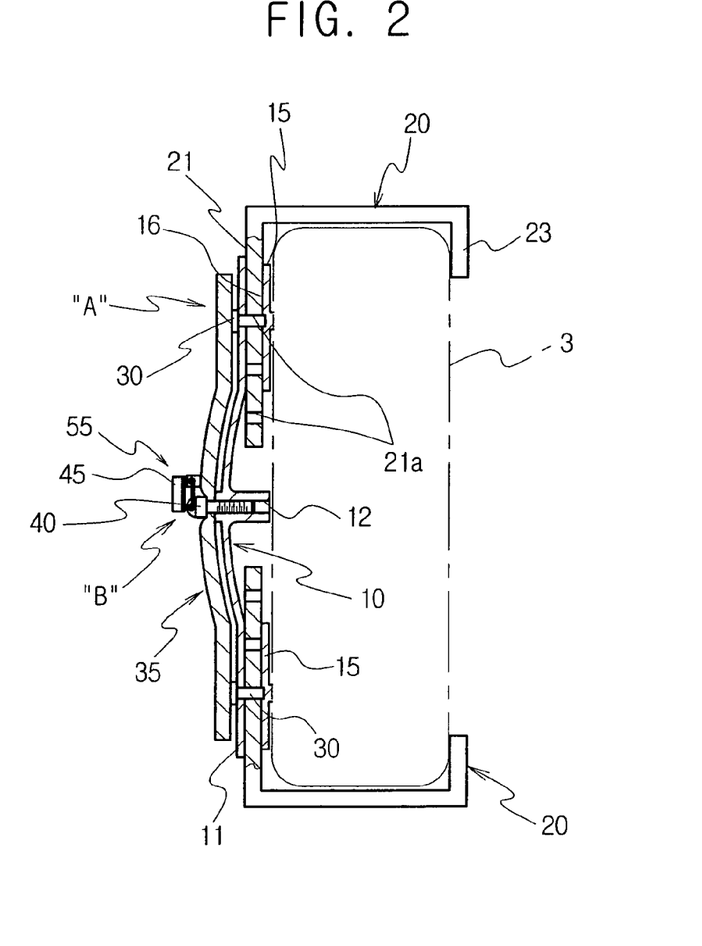
FIG. 2 is a schematic cross-sectional view of the wheel locking device in accordance with an embodiment of the present invention.
Figure 4:
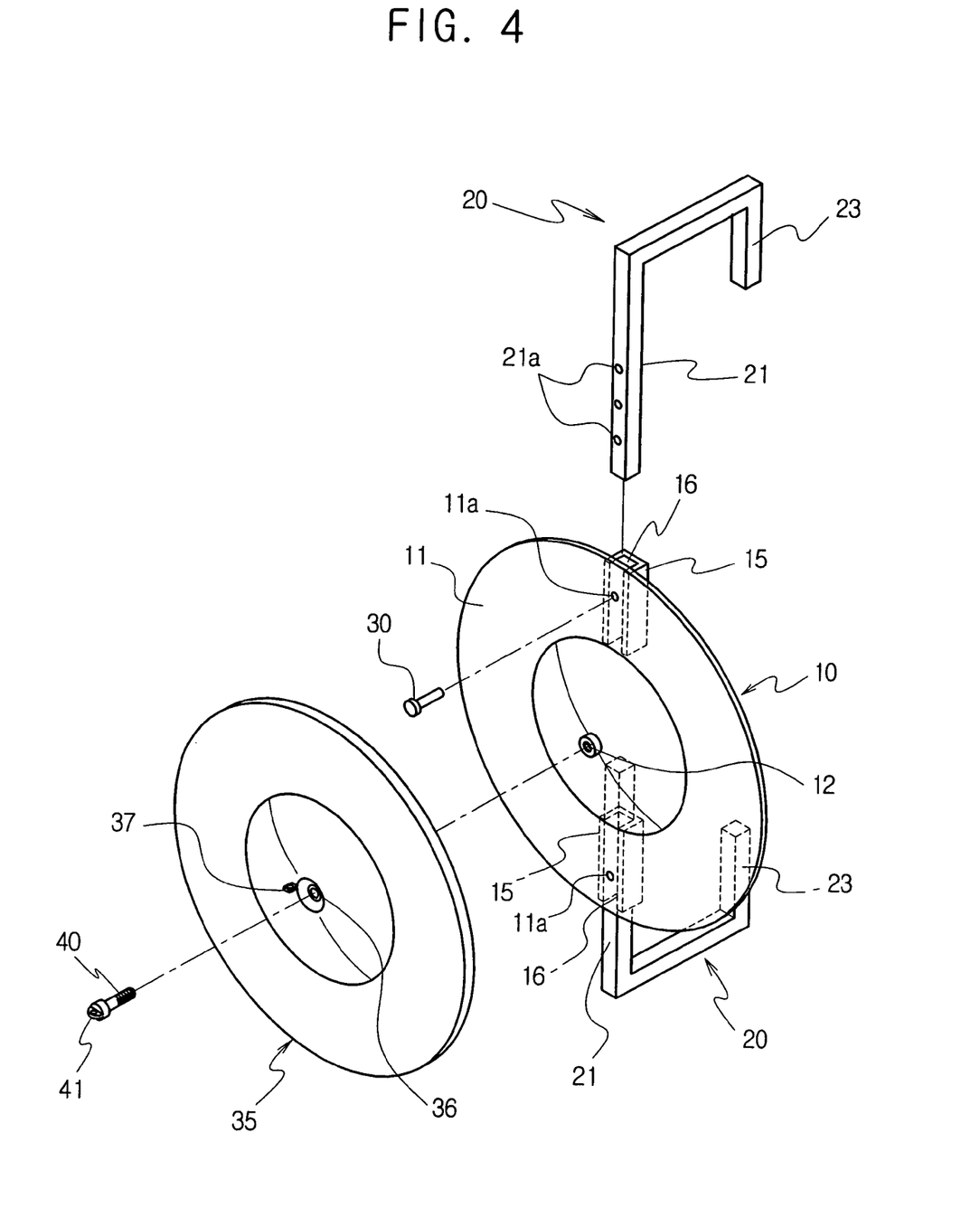
FIG. 4 is an exploded perspective view of essential parts of the wheel locking device in accordance with an embodiment of the present invention.

The supporting disk 10 is provided with at least one arm 15 being radially formed along its circumference and having a long hole 16 formed through the arm 15.

Each of the fixtures 20 includes an insertion part 21 inserted into the hole 16 of the arm 15, and a clamp part 23 formed in U-shape so as to surround an inner side surface of the wheel 3.

Each of the clamping pins 30 is inserted into a body 11 of the supporting disk 10 and the insertion parts 21 of the fixtures 20 so as to prevent the fixtures 20 from separating from the supporting disk 10.

The guard disk 35 surrounds an outer side surface of the supporting disk 10 so as to at least cover and protect the clamping pins 30 inserted into the supporting disk 10.

The clamping bolt 40 is screwed into the guard disk 35 and the supporting disk 10 so as to hold the guard disk 35 and the supporting disk 10 together.

The locking means 55 prevents the loosening of the clamping bolt 40 from the guard disk 35 and the supporting disk 10.

Herein, the locking means 55 may be variously constituted. For example, the locking means 55 includes loops 41 and 37 formed on the clamping bolt 40 and the guard disk 35, or a wire or a T-type pin inserted into the loops 41 and 37 and a lock 45 for locking the inserted state of the wire or the T-type pin into the loops 41 and 37. That is, the locking means 55 may have any structure which can prevent the loosening of the clamping bolt 40 from the guard disk 35 and the supporting disk 10. Those skilled in the art will appreciate that such modifications and substitutions of components are possible, without departing from the scope and spirit of the present invention.

Further, although the clamping bolt 40 for holding the supporting disk 10 and the guard disk 35 together may be inserted into a central portion of each of the supporting disk 10 and the guard disk 35, the clamping bolt 40 may be inserted into plural portions of each of the supporting disk 10 and the guard disk 35.

Figure 5:
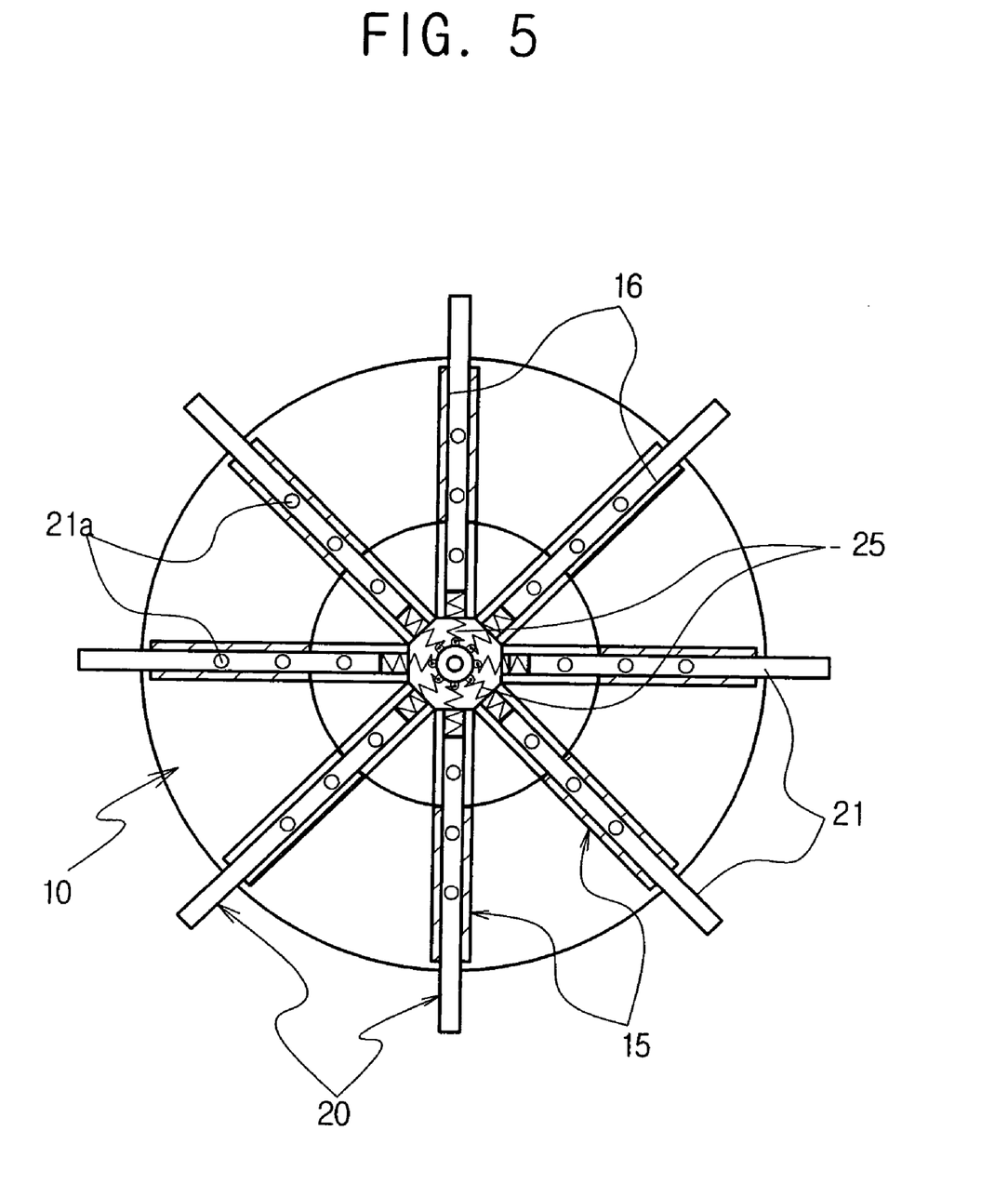
FIG. 5 is a schematic back view of a wheel locking device in accordance with a further embodiment of the present invention.

As shown in FIG. 5, the locking device (L) comprises a plurality of the arms 15 of the supporting disk 10 and a plurality of the fixtures 20 inserted into the corresponding arms 15. Further, an elastic spring 25 is installed on an inner end of the arm 15 so that the fixture 20 is elastically inserted into the arm 15.

Hereinafter, the operation and function of the above-described wheel locking device of present invention will be described.

The locking device (L) of the present invention serves as means for preventing an unauthorized movement of an illegally parked vehicle, or as theft-prevention means of a vehicle.

Figure 1:
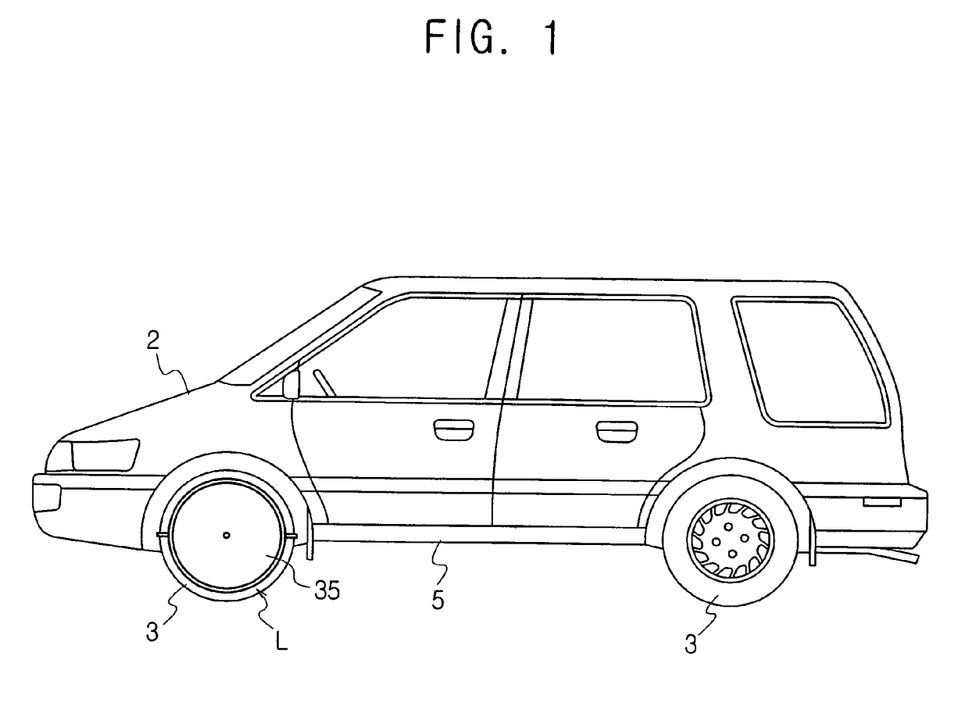
FIG. 1 is a front view of a vehicle provided with a wheel locking device attached thereto in accordance with an embodiment of the present invention.

The above locking device (L) is attached to a wheel 3 of a vehicle 2 by fixing the supporting disk 10 to a center of an outer side surface of the wheel 3 and inserting the fixtures 20 into the corresponding arms 15 radially formed along the inner circumference of the supporting disk 10.

Herein, the insertion parts 21 of the fixtures 20 are inserted into the holes 16 of the corresponding arms 15 so that the clamp parts 23 of the fixtures 20 surround a circumferential surface of the wheel 3.

After the insertion parts 21 of the fixtures 20 are inserted into the holes 16 of the arms 15, the clamping pins 30 are inserted into pin holes 11a of the supporting disk 10, through holes 21a of the insertion parts 21, and pin grooves 15a of the arms 15, thereby preventing the fixtures 20 from separating from the locking device (L).

Herein, the length of the insertion parts 21 of the fixtures 20, which are inserted into the holes 16 of the arms 15, is adjusted according to the size of the wheel 3 of the vehicle 2 by inserting the clamping pins 30 into one selected from the plural through holes 21a formed in the insertion parts 21. That is, the fixtures 20 effectively surround the circumferential surface of the wheel 3 regardless of the size of the wheel 3, and then the fixtures 20 are securely fixed to the wheel 3 with the clamping pins 30.

Since the clamping pins 30 are pushed so as to be insertedly fitted into the pin grooves 15a of the arms 15, if any external force is applied to the clamping pins 30, the once inserted clamping pins 30 maintain their inserted states.

In this manner, the plural fixtures 20 are inserted into the corresponding arms 15 of the supporting disk 10 so as to surround the circumferential surface of the wheel 3.

As shown in FIG. 5, eight arms 15 are formed on the supporting disk 10. However, the number of the arms 15 of the supporting disk 10 is not limited. That is, four arms 15 may be formed on the supporting disk 10. Preferably, at least two arms 15 are formed on the supporting disk 10.

Further, as shown in FIG. 5, the elastic spring 25 is installed on the inner end of the arm 15. Thereby, when the insertion part 20 of the fixture 20 is inserted into the arm 15, the insertion part 20 is elastically supported by the elastic spring 25 so that the through holes 21a of the insertion part 20 are effectively aligned with the corresponding pin holes 11a of the supporting disk 10, and then the clamping pins 30 are assembled into the locking device (L).

After the plural fixtures 20 are inserted into the corresponding arms 15 of the supporting disk 10 and fixed to the arms 15 by the clamping pins 30, the guard disk 35 is secured to the supporting disk 10 by the clamping bolt 40 so that the guard disk 35 surrounds the external surface of the supporting disk 10.

Herein, since the clamping pins 30 inserted into the pin holes 11a formed in the supporting disk 10 are covered with the guard disk 35, and the locations of the clamping pins 30 are not seen from the outside.

Figure 2A:
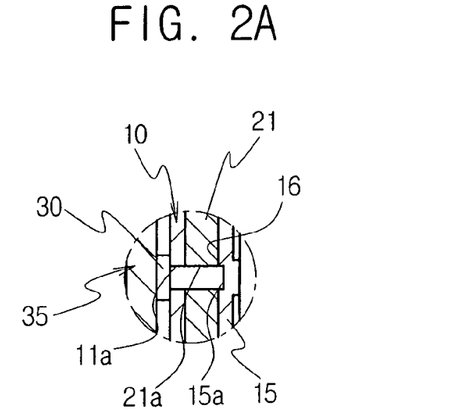
FIG. 2A is an enlarged view of a portion "A" of FIG. 2.
Figure 2B:
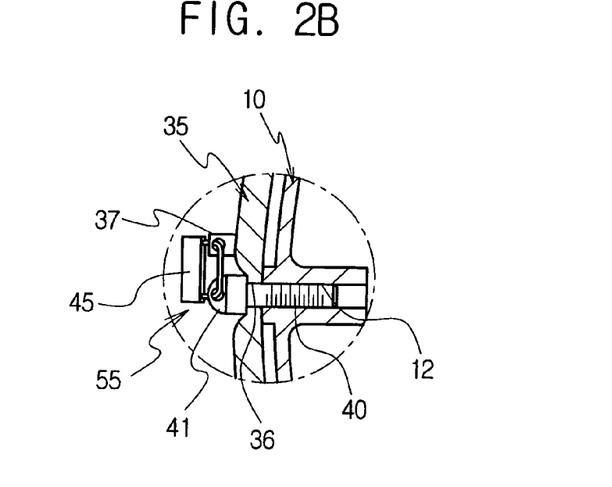
FIG. 2B is an enlarged view of a portion "B" of FIG. 2.
Figure 3:
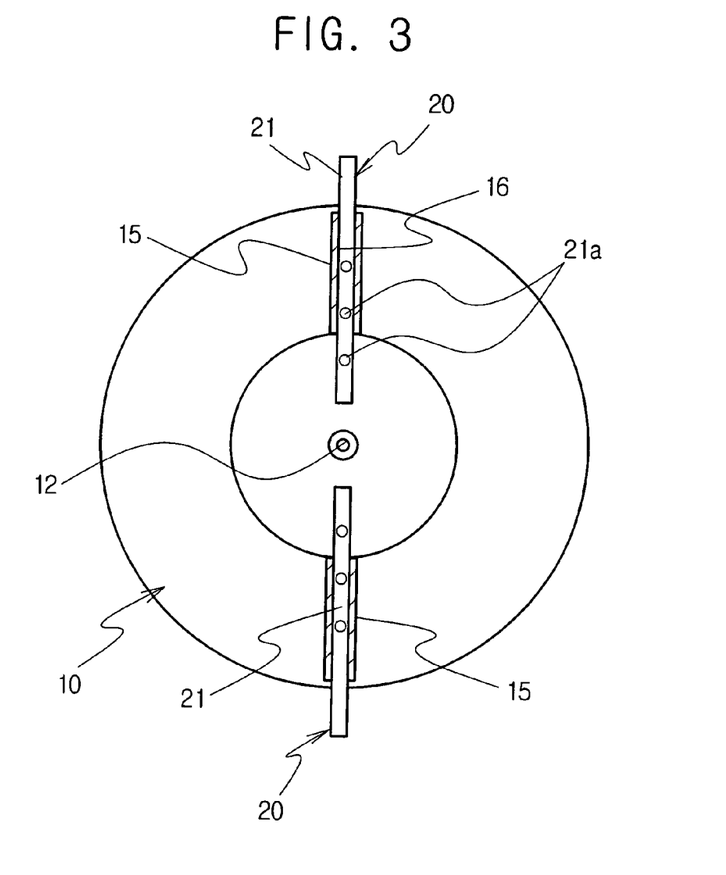
FIG. 3 is a back view of the wheel locking device in accordance with an embodiment of the present invention.

Then, the clamping bolt 40 holding the supporting disk 10 and the guard disk 35 together is locked by the lock 45 via the loops 41 and 37 formed on the clamping bolt 40 and the guard disk 35. Thereby, the loosening of the clamping bolt 40 from the supporting disk 10 and the guard disk 35 is prevented.

In the locking device (L) of the present invention, the fixtures 20 surround plural portions on the circumferential surface of the wheel 3 and are fixed to the wheel 3 by the clamping pins 30. The guard disk 35 is secured to the supporting disk 10 by the clamping bolt 40 so as to surround the clamping pins 30, and the secured state of the guard disk 35 and the supporting disk 10 is locked by the conventional lock 45. Therefore, the locking device (L) of the present invention is easily attached to a wheel of vehicles and is effectively protected from an unauthorized separation from the wheel.

Figure 6:
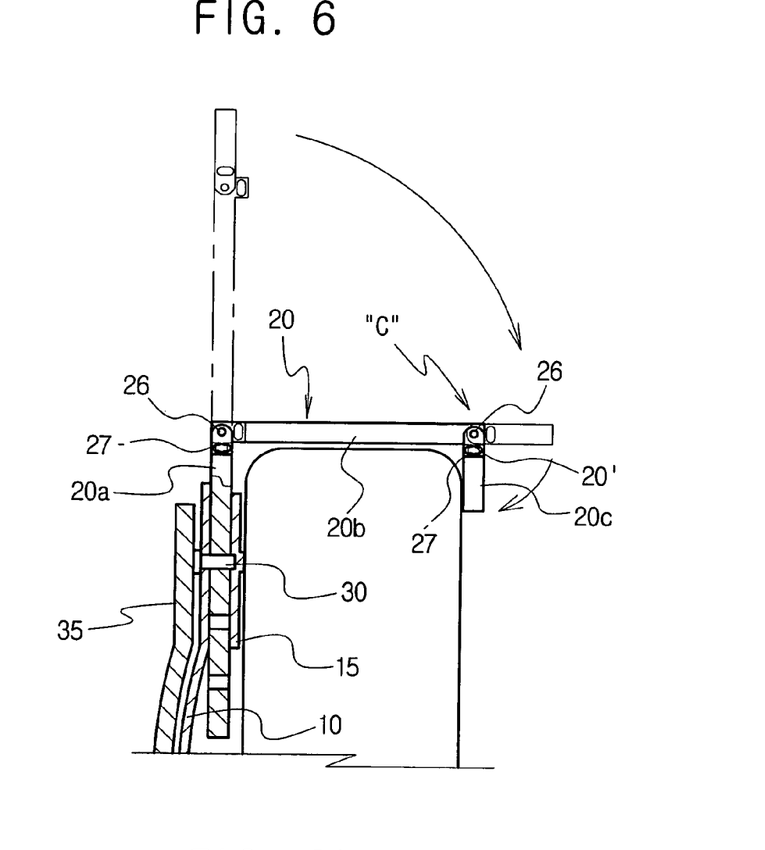
FIG. 6 is a cross-sectional view of essential parts of a wheel locking device in accordance with another embodiment of the present invention.
Figure 6A:
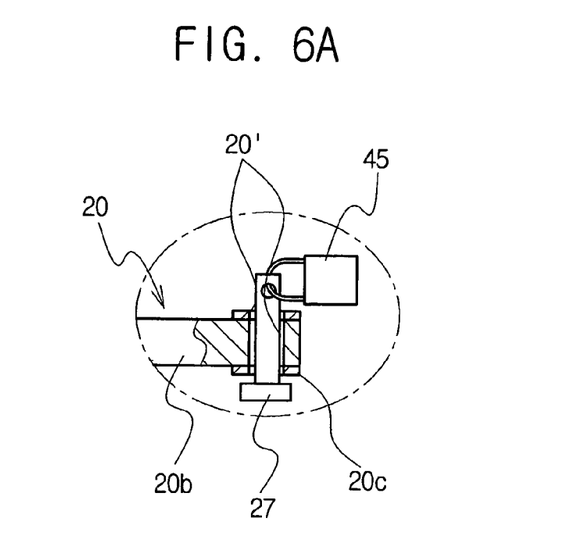
FIG. 6A is an enlarged view of a portion "C" of FIG. 6.
Figure 7:
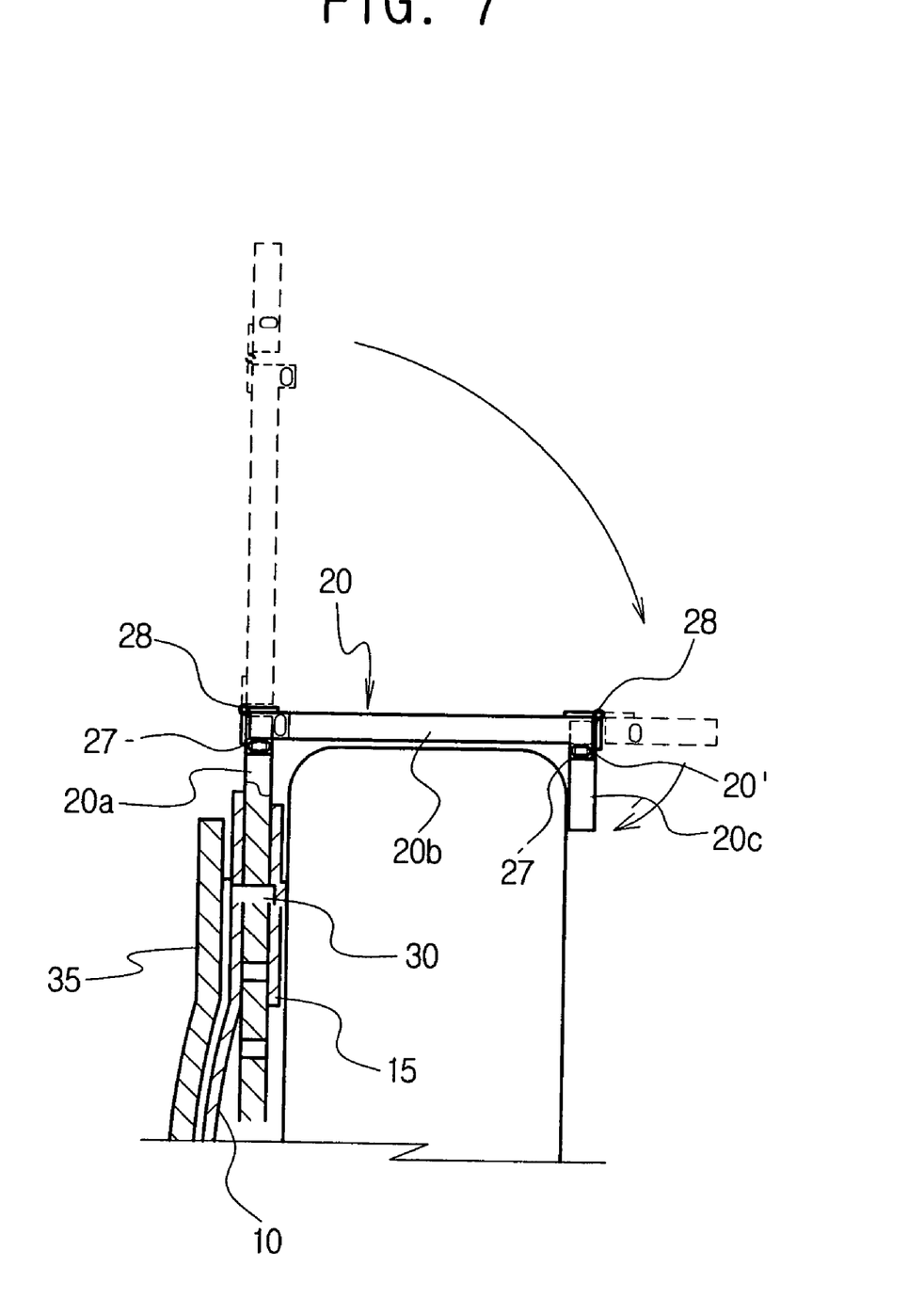
FIG. 7 is a cross-sectional view of essential parts of a wheel locking device in accordance with yet another embodiment of the present invention.

When a user wants to separate the locking device (L) of the present invention from the wheel of the vehicle, the user first unlocks the lock 45 and, then sequentially separates the clamping bolts 40, the guard disk 35, the clamping pins 30, the supporting disk 10 and the fixtures 40 from the locking device (L) The fixture 20 of the present invention may have various structures as shown in FIGS. 6, 6A, and 7. That is, in case the U-shaped fixture 20 interferes with a frame 5 of the vehicle 2, a folding-type fixture 20 is formed so as to be easily and effectively attached to the wheel 3.

In FIGS. 6 and 6A, the folding-type fixture 20 includes three portions 20a, 20b, and 20c rotatably connected to each other by hinges 26, and a T-type pin 27 is inserted into a through hole 20' formed through connection areas between the two portions so that an end of the pin 27 is fixed by the conventional lock 45 so as to prevent the pin 27 from separating from the through hole 20'.

Each of the portions 20a, 20b, and 20c of the fixture 20 is rotated on the hinge 26 so as to unfold the fixture 20. Then, the portion 20a is inserted into the corresponding arm 15, and each of the portions 20a, 20b, and 20c of the fixture is rotated on the hinge so as to fold the fixture 20. The T-type pin 27 is inserted into each through hole 20' formed through connection areas between the two portions so that the fixture 20 is not unfolded again, and an end of the through hole 20' is locked by the conventional lock 45.

Therefore, differently from the U-shaped fixture 20 described in the earlier embodiment of the present invention, the folding-type fixture 20 is easily fixed to the wheel 3 so as to surround the circumferential surface of the wheel 3 without interfering with the frame 5 of the vehicle 2.

Further, compared to the above embodiment of FIG. 6, in the folding-type fixture 20 in accordance with yet another embodiment of FIG. 7, the end of the T-type pin 27 inserted into each through hole 20' formed through connection areas between the two portions is locked by other locking means 28.

Figure 8:
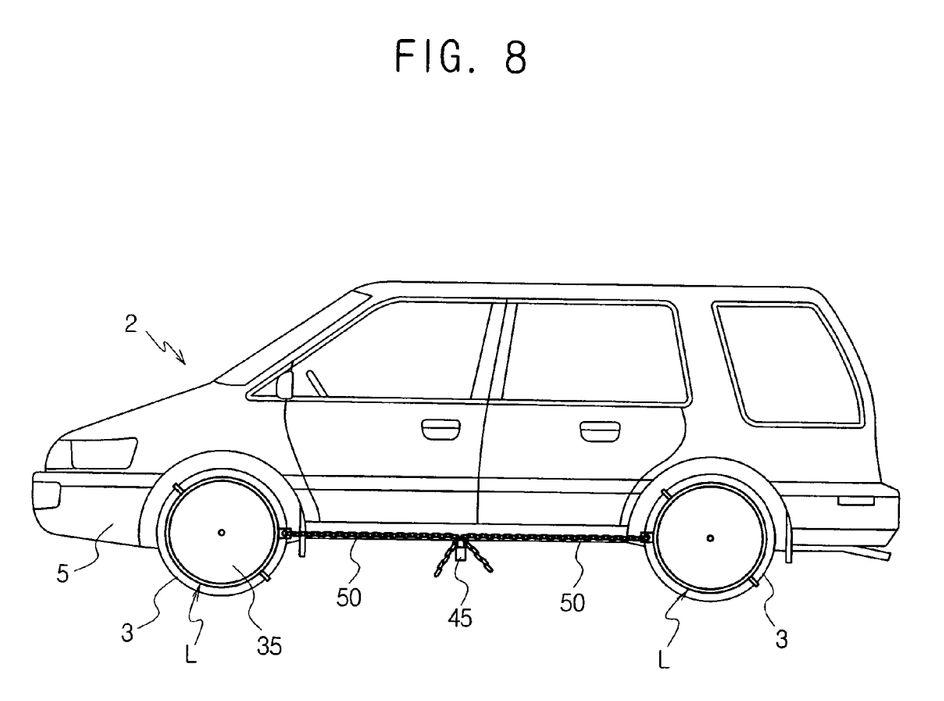
FIG. 8 is a front view of a wheel locking device in accordance with yet still another embodiment of the present invention.

FIG. 8 shows a wheel locking device in accordance with yet still another embodiment of the present invention. Herein, the locking device (L) of the present invention is respectively attached to front and rear wheels 3 of a vehicle 2 so that one end of each of two metal wires 50 is connected to the guard disk 35 of the locking device (L) attached to each of the front and rear wheels 3 and the other ends of the two metal wires 50 are interconnected and locked up by means of the conventional lock 45. That is, in this embodiment of the present invention, the locking device (L) is respectively fixed to the front and rear wheels 3, and two locking devices (L) are interconnected via the metal wires 50. Therefore, compared to the earlier embodiments using one locking device (L), this embodiment using two locking devices (L) is more securely fixed to the wheels of the vehicles, thereby more effectively protecting the locking device (L) from an unauthorized separation from the wheel.

INDUSTRIAL APPLICABILITY

As apparent from the above description, the present invention provides a wheel locking device for vehicles, which is attached to a wheel of a vehicle so that a plurality of fixtures surrounds a circumferential surface of the wheel in order to easily and firmly fix the wheel, thereby preventing an unauthorized movement of the vehicle and maximizing reliability in use.

Particularly, the locations of the fixtures are adjusted according to the size of the wheel of the vehicle. Further, in case the fixture is a folding-type fixture including a plurality of portions rotatably connected to each other by hinges, the folding-type fixture is easily attached to the wheel without interfering with the frame of the vehicle, thereby being fixedly secured to the wheel.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A wheel locking device for a vehicle, which is to be attached to a wheel of a vehicle so as to surround the wheel and lock the wheel by means of a lock so as to prevent an unauthorized movement of the vehicle, comprising:

a supporting disk provided with at least one arm being radially formed along its inner circumference and having a long hole formed through the arm;

fixtures, each including an insertion part inserted into the hole of the arm, and a clamp part formed in U-shape so as to surround an inner side surface of the wheel;

an elastic spring installed on an inner end of the arm so that said insertion of said insertion part into said hole is elastic;

clamping pins, each being inserted into a body of the supporting disk and the insertion parts of the fixtures so as to prevent the fixtures from separating from the supporting disk;

a guard disk for surrounding an outer side surface of the supporting disk so as to at least cover and protect the clamping pins inserted into the supporting disk;

a clamping bolt screwed into the guard disk and the supporting disk so as to hold the guard disk and the supporting disk together; and locking means for preventing the loosening of the clamping bolt from the guard disk and the supporting disk.

2. A wheel locking device for a vehicle, which is to be attached to a wheel of a vehicle so as to surround the wheel and lock the wheel by means of a lock so as to prevent an unauthorized movement of the vehicle, comprising:

a supporting disk provided with at least one arm being radially formed along its inner circumference and having a long hole formed through the arm;

fixtures, each including an insertion part inserted into the hole of the arm, and a clamp part formed in U-shape so as to surround an inner side surface of the wheel, the fixtures each further including three portions rotatably connected to each other by hinges and wherein a T-type clamping pin is inserted into a through hole formed through connection areas between two adjacent ones of the three portions so that an end portion of the clamping pin is locked by using a lock so as to prevent the clamping pin from separating from the through hole;

clamping pins, each being inserted into a body of the supporting disk and the insertion parts of the fixtures so as to prevent the fixtures from separating from the supporting disk;

a guard disk for surrounding an outer side surface of the supporting disk so as to at least cover and protect the clamping pins inserted into the supporting disk;

a clamping bolt screwed into the guard disk and the supporting disk so as to hold the guard disk and the supporting disk together; and locking means for preventing the loosening of the clamping bolt from the guard disk and the supporting disk.

3. A wheel locking system for a vehicle, comprising a pair of wheel locking devices which are to be attached respectively to front and rear wheels of a vehicle so as to surround the wheels and lock the wheels by means of a lock so as to prevent an unauthorized movement of the vehicle, each of the wheel locking devices comprising:

a supporting disk provided with at least one arm being radially formed along its inner circumference and having a long hole formed through the arm;

fixtures, each including an insertion part inserted into the hole of the arm, and a clamp part formed in U-shape so as to surround an inner side surface of the wheel;

clamping pins, each being inserted into a body of the supporting disk and the insertion parts of the fixtures so as to prevent the fixtures from separating from the supporting disk;

a guard disk for surrounding an outer side surface of the supporting disk so as to at least cover and protect the clamping pins inserted into the supporting disk;

a clamping bolt screwed into the guard disk and the supporting disk so as to hold the guard disk and the supporting disk together;

locking means for preventing the loosening of the clamping bolt from the guard disk and the supporting disk; and wherein the wheel locking system further comprises respective metal wires attached to the respective guard disks of the respective wheel locking devices and a lock for interconnecting the metal wires and locking the metal wires together.

* * * * *